United States Patent
Denman

[11] Patent Number: 5,827,029
[45] Date of Patent: Oct. 27, 1998

[54] SECURITY CAP FOR FASTENER DEVICES

[76] Inventor: Philip Denman, c/o Detroit International Limited Unit 24, Signal Way Industrial Estate, Old Town, Swindon, Wiltshire, United Kingdom, SN3 1PD

[21] Appl. No.: 889,983

[22] Filed: Jul. 10, 1997

[30] Foreign Application Priority Data

Jul. 12, 1996 [GB] United Kingdom ................ 9614707

[51] Int. Cl.⁶ ........................................ A47G 3/00
[52] U.S. Cl. ..................... 411/373; 411/431; 411/429; 411/910
[58] Field of Search .................... 411/910, 431, 411/429, 373, 372, 377

[56] References Cited

U.S. PATENT DOCUMENTS

| | | | |
|---|---|---|---|
| 4,295,766 | 10/1981 | Shaw | 411/429 |
| 4,668,143 | 5/1987 | Rotar | 411/429 |
| 4,756,652 | 7/1988 | Hatter | 411/910 |
| 4,777,775 | 10/1988 | Verble | 411/431 |
| 4,841,838 | 6/1989 | Scully | 411/910 |
| 5,469,726 | 11/1995 | Rushing | 411/429 |
| 5,651,651 | 7/1997 | Spencer | 411/910 |

Primary Examiner—Flemming Saether
Attorney, Agent, or Firm—Haugen and Nikolai, P.A.

[57] ABSTRACT

A device for restricting access to the head (10) of a fastener (9) has a first part (18) including an attaching flange (26) adapted to be captive between the head (10) and a member 14 in which the shank (12) of the fastener is to be received. The first part (18) has a recess (13) which the head (10) is accommodated and the second part of the device (20) is dimensioned to be slidingly received in the recess to close the recess without engaging the head (10). The first and second parts (18, 20) have formations (30, 38) which cooperate when the second part 20 is sufficiently inserted into the recess (30), to prevent withdrawing of the second part (20) from engagement with the first part (18), whereby to prevent access to the fastener. The first and second parts comprise frustroconical external surfaces (22, 24), which in use taper in a direction away from the member (14) to which the device is to be secured in use.

9 Claims, 1 Drawing Sheet

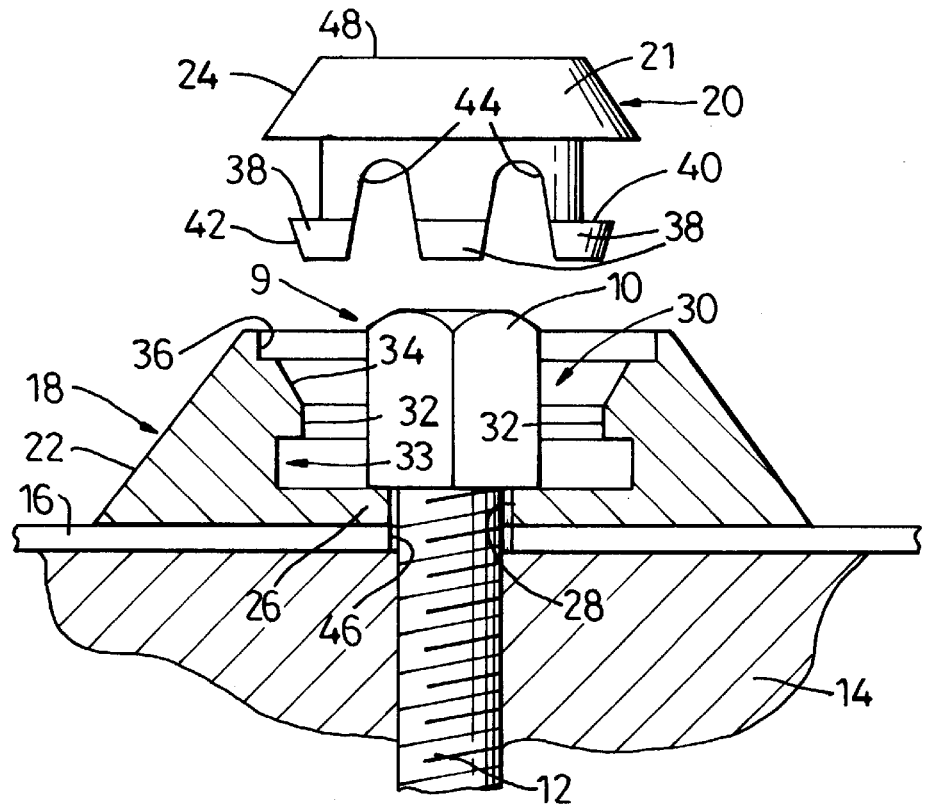
Fig. 1
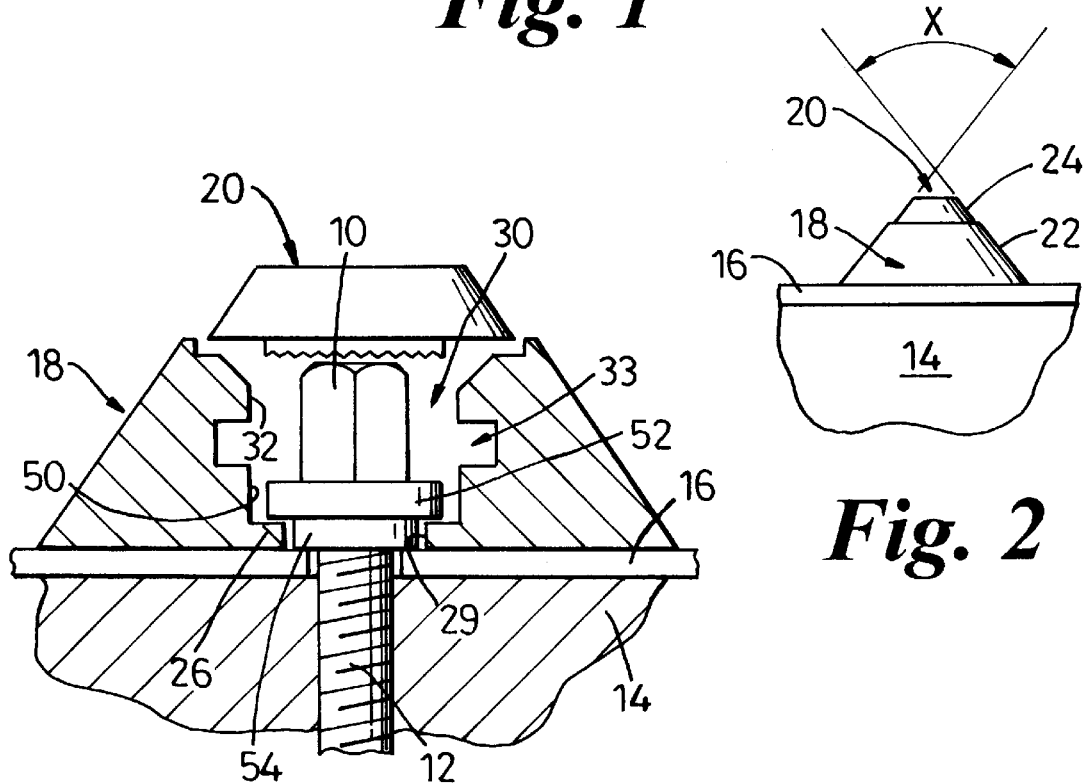
Fig. 2
Fig. 3

5,827,029

SECURITY CAP FOR FASTENER DEVICES

BACKGROUND OF THE INVENTION

This invention is concerned with a device for restricting access to a head element of a fastener having a head element and a shank element. Such fasteners include bolts (where the head element is integral with a threaded shank element) and studs which are threaded and provide the shank element, the head element being provided by a nut threadingly engaged with the threaded stud. The fastener may also be provided by a screw, for example having a tapered threaded shank and an integral head element.

In some circumstances it is desirable to prevent access to the head element of a fastener having a head element and a shank element, for example a rotatable bolt which may be received in a member to which the bolt is to be attached, for example by threaded engagement with a threaded bore in the member or by other means. Various means have been proposed for restricting access to a head element of a fastener. Amongst the proposals which have been made are those described in GB-A-2082711 which describes a protective cap which is retained in place over the head of a bolt, to restrict access, by means of a locking member, WO-A-8502447 which describes a collar disposed around the fastener head and a snap-fit closure member which is a resilient snap-fit with the collar for shielding the fastener head and GB-A-2220723 which describes a security means comprising a component with a recess within which a nut (in its tightened position) is received and a closure component received as a non-removable force fit in the recess in the first component to prevent access to the nut.

None of these have been altogether satisfactory insofar as, although they restrict access to the head element of the fastener, they provide protrusions which can be readily attacked by suitable implements, for example cold chisels to remove the protection. Furthermore, there are other disadvantages, for example the means by which the parts are retained together may require use of a number of separate components (GB-B-2082711), or rely on means which does not provide a positive interlocking arrangement to secure the parts together (WO-A-8502447 and GB-A-2220723).

SUMMARY OF THE INVENTION

One of the objects of the present invention is to provide an improved device for restricting access to a head element of a fastener having a head element and a shank element.

Another of the various objects of the present invention is to provide an improved method of preventing access to a head element of a fastener.

The invention may be considered to provide, in one aspect, a device for restricting access to a head element of a fastener having a head element and a shank element the device having a first part including attachment means adapted to be captive between the head element and a member in which the shank element of the fastener is received, the first part defining a recess in which the head element is accommodated and the device having a second part dimensioned to be slidingly received in the recess to close the recess, without engaging the head element, the first and second parts having formations which cooperate when the second part is sufficiently inserted into the recess to prevent withdrawal of the second part from engagement with the first part, whereby to prevent access to the fastener.

Preferably, the first part of a device in accordance with the invention comprises a frustroconical external surface which, in use, tapers in a direction away from a member to which the device is secured in use; suitably the external surface is a frustrum of a cone having an apex angle of greater than 60°, conveniently about 80°.

In a preferred device in accordance with the invention the second part of the device has a portion which, when it is secured in place in the recess, projects beyond the recess, the projecting portion also having an external surface which is frustroconical. Conveniently, the frustroconical surface of the second part has an apex angle which is substantially the same as that of the frustroconical surface of the first part. Suitably, there is a substantially smooth transition between the frustroconical external surface of the first and second parts, at their junction.

Preferably, the recess in the first part of a device in accordance with the invention has a part of greater dimensions at its mouth (eg larger diameter) and a part which is narrow remote from the mouth and the second part has a head portion which seats in the part of greater dimension; this restricts the amount by which the second part may be inserted into the recess and ensures a firm seating for the second part in the recess.

In a preferred device in accordance with the invention the first and second parts are made of hardened steel. This militates against successful attack on the first and second parts. Because the outer surfaces of the first and second parts of this preferred device in accordance with the invention are frustroconical, it is difficult for a cold chisel or any form of mechanical cutting tool to obtain a satisfactory purchase on the parts for cutting them away, thus providing additional security. However, a similar device may be of use in preventing access to a fastener, for example by a small child, to avoid the child unscrewing the fastener, where the first and second parts are made of plastics material.

In a preferred device in accordance with the invention the formation in the first part is provided by a shoulder in the recess and the formation in the second part comprises a plurality of spring fingers having stepped end portions which, when the second part is inserted into the recess, are forced past the shoulder and spring into latching engagement with the shoulder to retain the second part securely within the recess.

There now follows a detailed description to be read with reference to the accompanying drawings of a device for restricting access to a head element of a fastener and the method of using the device, embodying the invention. It will be realised that this device and method have been selected for description to illustrate the invention by way of example.

IN THE DRAWINGS

In the accompanying drawings:

FIG. 1 is a side view, partly in section, showing a first device embodying the invention in the course of assembly;

FIG. 2 is a side view of the first illustrative device in a assembled condition; and FIG. 3 is a view similar to the view of FIG. 1 but showing a second device embodying the invention.

DESCRIPTION OF THE PREFERRED EMBODIMENT

The first illustrative device shown in FIG. 1, is intended for use with a fastener 9 having a head element 10 and a shank element 12, for example a bolt (as shown in FIG. 1). The head element has a portion of hexagonal cross-section for engagement with a spanner (not shown) whereby to tighten the bolt by rotation to screw the threaded shank element 12 into a member 14 (for example a concrete beam or a threaded metal member) whereby to tighten the bolt. It will be realised that the bolt 9 is intended for use in securing a component 16 to the member 14.

Although a device in accordance with the invention may be used to restrict access to a head element of most fasteners having a head element and a shank element, the device is of particular usefulness where the head element 10 is to be rotated to secure the component 16 to the member 14. The component 16 may, for example, be a security bar and the member 14 may be the wall of a building adjacent a window, to which the security bar is to be attached. However, a device in accordance with the invention may be used in other situations eg for fixing security grilles over window openings or fixing safes to the walls or floors of buildings or post boxes to a structure, or may be used to secure any items together by means of threaded fasteners having head elements and shank elements.

Whereas the head element 10 is of configuration to be engaged and rotated by a spanner, other forms of head element having a slot for engagement with the bit of a screwdriver or having a shaped recess for engagement with a suitably correspondingly shaped projection (referred commonly as an Allen key), may be used.

The first illustrative device comprises a first part 18 and a second part 20. Both the first and second parts 18, 20 are circular in plan and have frustroconical external surfaces 22, 24 respectively.

The first part 18 comprises attachment means provided by an inwardly projecting annular flange 26 having a central opening 28 at the bottom of a recess 30 defined by the first part. The first part further has a formation provided by an annular inwardly projecting shoulder 32, spaced from the annular flange 26 in the recess to provide an annular pocket 33. The shoulder has a frustroconical guide surface 34 tapering from the mouth of the recess 30 remote from the flange 26, towards the flange 26. The recess 30 has a part 36 at its mouth which is of greater diameter than the remainder of the recess.

The second part 20 is dimensioned to be slidingly received in the recess 30. The recess 30 is of such a size as to accommodate the head element 10 of the fastener 9 with the head 10 spaced from the walls of the recess and the shank element 12 of the fastener passing through the opening 28, as shown in FIG. 1. The second part 20 has a central opening (not shown) in which the head element 10 of the fastener 9 can be received without engaging the walls of the second part.

The second part 20 has formations provided by spring fingers 38 having stepped end portions 40 and tapering external surfaces 42. The second part also has a head 21 on which the frustroconical surface 24 is provided.

Both the first and second parts are machined from steel, suitably a hardened steel to give added security. The fingers 38 are formed by milling slots 44 in a generally cylindrical portion of the second part 20.

In use the first illustrative device is assembled with a fastener 9 with the shank element 12 of the fastener passing through the hole 28 and the head element 10 abutting the flange 26. The fastener 9 is then rotated in known manner with the shank element 12 engaged in a threaded hole in a member 14 to which a component 16 is to be secured with the shank element also passing through an opening 46 in the component 16. As can be seen viewing FIG. 1 the head element 10 is spaced from the walls of the first part of the illustrative device which define the recess 30.

When the fastener 9 has been fully tightened to secure the component 16 against the member 14 (which may, for example be the wall of a building) the second part 20 is aligned with the recess 30 as shown in FIG. 1, with the head element 10 of the fastener aligned with the opening (not shown) in the second part 20 of the device.

The second part 20 is then placed with the tapering surfaces 42 of the fingers 38 against the guide surfaces 34 of the first part and the second part 20 and tapped on the flat outer face 48 to urge the second part into the recess 30, the spring fingers being urged inwardly by the camming action of the faces 34, 42 until the stepped end portions 40 of the fingers 38 pass the shoulder 32. The fingers 38 then spring outwardly so that the stepped end portions 40 are in the pocket 33 in latching engagement with the shoulders 32 thus retaining the second part securely in the recess 30.

As can be seen the flange 26 is held captive between the head element 10 of the fastener 9 and the member within which the shank element 12 is received.

The head portion 21 of the second part of the first illustrative device is received in the part 36 of the recess 30 which is of greater diameter. When seated with the head 21 in the part 36 of the recess abutting the floor of the part 36, there is a substantially smooth transition between the frustroconical external surfaces 22, 24 of the first and second parts 18, 20 at their junction, as can be seen viewing FIG. 2 which shows the first illustrative device in use.

The frustroconical external surfaces 22, 24 of the first and second parts 18, 20 have the same apex angle which is conveniently about 80°. The angle X opposed to the apex angle (which is equivalent to the apex angle) is indicated on FIG. 2 between the dashed lines on FIG. 2. As can be seen the external surfaces 22, 24 taper in a direction away from the member 14 to which the device is secured in use.

The second part 20 is thus held by engagement of the stepped portions 40 of the fingers 38 with the shoulder 32 which cooperate when the second part is sufficiently inserted in the recess, to prevent withdrawal of the second part 20 from the first part 18, thus to prevent access to the fastener 9.

Because the first illustrative device is made of hardened steel, it is difficult to remove the illustrative device by any form of drilling or cutting. The frustroconical surfaces 22, 24 make it very difficult for any cutting implement or chisel to get any purchase on the illustrative device. Because the recess 30 is of circular cross-section, as is the second part 20, even if a purchase can be gained on the part 20, this will merely rotate within the recess 30 and, because it is spaced from the head element 10 of the fastener 9, rotation of the part 20 will not rotate the fastener. Furthermore, because the first part 18 is securely clamped against the member 14, it is difficult or impossible to rotate that, again preventing rotation of the fastener 9 to unscrew it.

The second illustrative device is generally similar to the first illustrative device, except as hereinafter described and like numbers represent like parts.

In the second illustrative device the first part 18 has a recess 30 with a portion 50 adjacent the flange 26, which is of generally the same diameter as the shoulder 32 and positioned between the flange 26 and pocket 33. The recess 30, therefore, is slightly deeper than in the first illustrative device.

A washer 52 is provided on the fastener 9 adjacent the head element 10 and is the diameter to be received in the portion 50 of the recess, spaced from the walls of the portion 50. A spacing member 54 is received in the opening 29 defined by the annular flange 26 (which is of greater diameter than the opening 28 in the first illustrative device). The spacing member is of the same or slightly smaller diameter than the head element of the fastener and is of considerably smaller diameter than the washer 52.

The spacing member 54 is slightly thicker than the flange 26. Thus, when the fastener 9 is screwed tight to secure the component 16 in engagement with the member 14, the spacing member 54 is urged tightly against the component 16 by the head element 10 and the washer 52. However, because the spacing member 54 is thicker than the flange 26 by a very slight amount, the washer 52 does not place any load directly on the flange 26. The first part 18 of the second illustrative device is therefore freely rotatable about the fastener 9 and the spacing between the component 16 and the first part 18 of the device is so small that it is difficult or impossible to insert any member by which leverage can be obtained to undo the fastener, eg by urging the washer 52 against the head element 20 thereby to provide sufficient frictional engagement between the head element 10 and the washer and the part 18, so that rotation of the part 18 would be sufficient to unscrew the fastener 9. The second illustrative device therefore provides even greater security against removal than the first illustrative device.

Whereas the first and second illustrative devices are made of hardened steel, it will be appreciated that they might be made of other materials. For example the illustrative devices could be made of a plastics material which could be used to provide sealing for a meter, for sample a gas meter: it would not be possible to gain access to the fasteners protected by such a plastic device without damaging the device, thus giving a clear indication that the seal has been tampered with, thereby providing security for the meter. It is of course possible to make the illustrative devices decorative as well as providing the security effect.

I claim:

1. In combination with a fastener having a head element and a shank element, a device for restricting access to the head element of said fastener with the access restricting device comprising first and second parts, and wherein:
    (a) said first part includes attachment means adapted to be captive between the head element of the fastener and a member in which the shank element of the fastener is received, the said first part further defining a recess in which the head element is accommodated;
    (b) said second part being dimensioned to be slidingly received in the recess formed idn the first part to close the recess, without engaging the head element;
    (c) the said first and second parts having formations which cooperate when the second part is sufficiently inserted into the recess formed in the first part to prevent withdrawal of the second part from engagement with the first part, whereby to prevent access to the fastener;
    (d) said first part comprising a frustroconical external surface which, in use, tapers in a direction away from a member to which the device is secured; and wherein the second part has a frustroconical surface with an apex angle which is substantially the same as that of the frustroconical surface of the said first part.

2. A device according to claim 1 wherein the external surface is a frustrum of a cone having an apex angle greater than 60°.

3. A device according to claim 1 wherein the apex angle is a frustrum of a cone having an apex angle of about 80°.

4. A device according to claim 1 wherein the second part of the device has a portion which, when it is secured in place in the recess, projects beyond the recess, the projecting portion having an external surface which is frustroconical.

5. A device according to claim 1 wherein the recess in the first part has a part of greater dimension at its mouth and the second part has a head portion which seats in the part of greater dimension.

6. A device according to claim 1 wherein the said first and second parts are made of hardened steel.

7. A device according to claim 1 wherein the formation in the first part is provided by a shoulder in the recess and the formation in the second part comprises a plurality of spring fingers having stepped end portions which, when the second part is inserted into the recess, are forced past the shoulder and spring into latching engagement with the shoulder to retain the second part securely within the recess.

8. A device according to claim 1 comprising a spacing member of smaller diameter than the head element between the head element and the member in which the shank element is received whereby the head element overlies but is spaced slightly from the attachment means in a direction extending lengthwise of the shank so that the first part is freely rotatable when the device is secured in place.

9. In combination with a fastener having a head element and a shank element, a device for restricting access to the head element of said fastener with the access restricting device comprising first and second parts, and wherein:
    (a) said first part includes attachment means adapted to be captive between the head element of the fastener and a member in which the shank element of the fastener is received, the said first part further defining a recess in which the head element is accommodated;
    (b) said second part being dimensioned to be slidingly received in the recess formed in the first part to close the recess, without engaging the head element;
    (c) the said first and second parts having formations which cooperate when the second part is sufficiently inserted into the recess formed in the first part to prevent withdrawal of the second part from engagement with the first part, whereby to prevent access to the fastener;
    (d) said first part comprising a frustroconical external surface which, in use, tapers in a direction away from a member to which the device is secured; and wherein the second part has a frustroconical surface with an apex angle which is substantially the same as that of the frustroconical surface of the said first part; and
    (e) said second part having a portion which, when secured in place in the recess formed in the first part, projects beyond the recess, and with the projecting portion having an external surface which is frustroconical, and wherein there is a substantially smooth transition between the frustroconical external surfaces of the first and second parts at their junction.

* * * * *